T. F. SNYDER.
AUTOMOBILE COUCH SEAT.
APPLICATION FILED JUNE 4, 1919.
1,318,930. Patented Oct. 14, 1919.
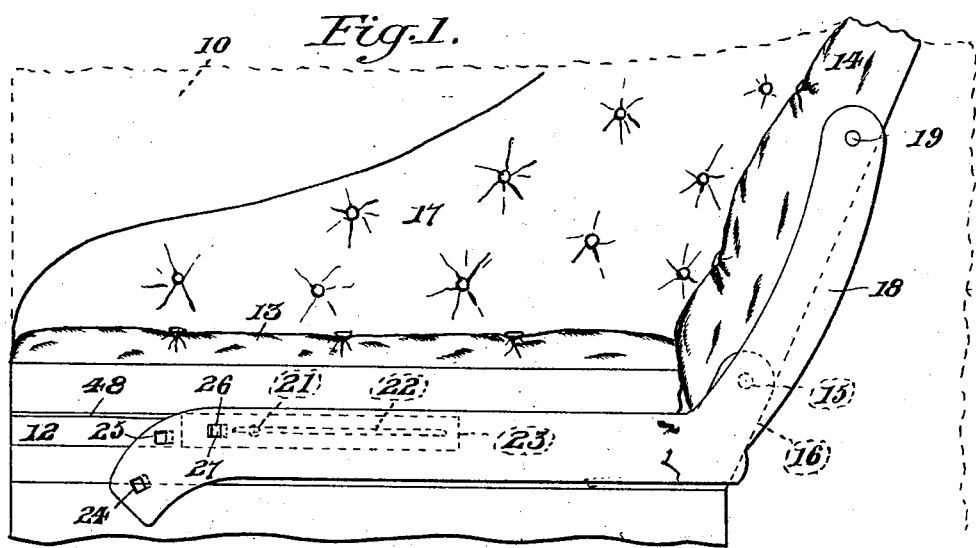
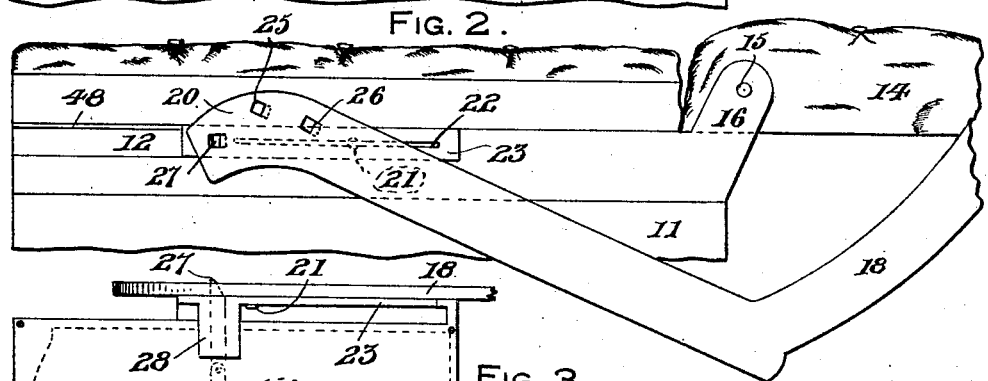
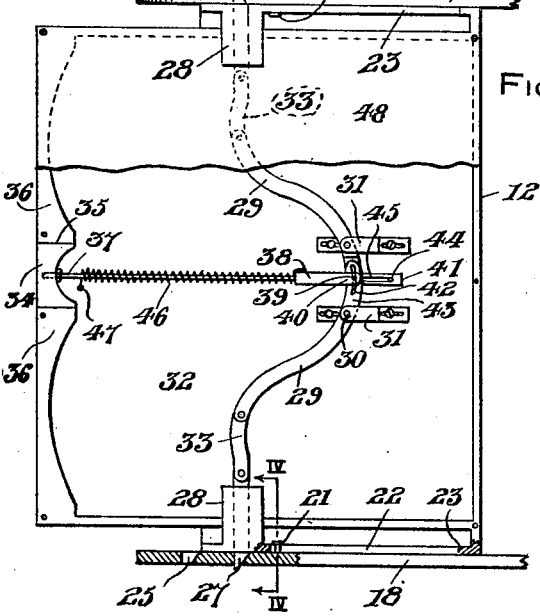
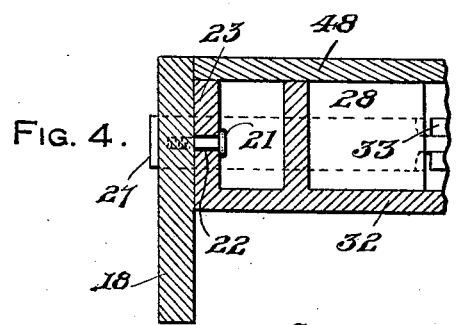
Inventor
T. F. Snyder
By
F. K. Bryant
Attorney.

UNITED STATES PATENT OFFICE.

THEOPHILUS FRANK SNYDER, OF DELPHOS, OHIO.

AUTOMOBILE COUCH-SEAT.

1,318,930.  Specification of Letters Patent.  Patented Oct. 14, 1919.

Application filed June 4, 1919. Serial No. 301,752.

*To all whom it may concern:*

Be it known that I, THEOPHILUS FRANK SNYDER, a citizen of the United States of America, residing at Delphos, in the county of Allen and State of Ohio, have invented certain new and useful Improvements in Automobile Couch-Seats, of which the following is a specification.

The primary object of the invention is the provision of a seat for automobiles, adapted for readily assuming a horizontal position for use as a couch, the structure possessing great strength for use as either a seat or a bed.

A further object of the invention is the provision of a front seat for an automobile adjustable to the horizontal, for employment as a bed in conjunction with the rear seat of the vehicle, releasable locking means being provided readily actuated forwardly of the front seat.

A still further object of the invention is the provision of a tiltable back for the front seat of an automobile having adjustable retaining means beneath the seat cushion for locking the back upright, inclined, or horizontal as desired, and releasable from a point centrally and easily accessible at the forward side of the front seat.

With these general objects in view and others that will become apparent as the nature of the invention is better understood, the same consists in the novel form, construction, combination and arrangement of parts hereinafter more fully described, illustrated in the accompanying drawings and then claimed.

In the drawings forming a part of this application and in which like reference characters refer to corresponding parts throughout the several views, Figure 1 is a side elevation of the invention partially broken away with a part of the automobile being indicated, Fig. 2 is a similar view with the invention positioned as a bed with the back of the seat horizontal, Fig. 3 is a top plan view of the retaining means and casing employed beneath the seat cushion with parts broken away, and Fig. 4 is an enlarged detail sectional view taken upon line IV—IV of Fig. 3.

The drawing illustrates the front seat provided in the automobile 10, the seat having a base 11 with a shallow casing 12 mounted thereon and supporting the usual seat cushion 13 in a horizontal position. An upholstered back 14 is pivoted at its lower end by trunnions 15 with upwardly projecting arms 16 upon the base 11, whereby it will be evident that the back 14 may be normally positioned substantially vertical as shown in Fig. 1 of the drawing, or horizontal as in Fig. 2 thereof. An upholstered inclined side 17 may be provided for the seat carried by each side of the base 11, only one side 17 being herein illustrated.

Angular arms 18 are pivoted as at 19 to the opposite sides of the back 14 with their free ends 20 forwardly positioned and slidably mounted on the casing 12 by means of pins 21 upon the arms positioned through slots 22 in side extensions 23 of said casing. Three keeper notches 24, 25 and 26 are provided in the curved ends 20 of the arms 18 adapted for retaining engagement by transverse slide bolts 27 mounted in housings 28 through the opposite sides of the casing 12 and extensions 22.

Oppositely curved levers 29 are pivoted at 30 to brackets 31 adjustably mounted upon the bottom 32 within the casing 12 and connected by pivotal links 33 with the bolts 27. A block 34 is slidably mounted in a slot 35 formed in the front wall 36 of the casing 12 having a push rod 37 within the casing provided with a head 38 bifurcated for the reception of the slotted adjacent end of the levers 29 therebetween. A pin 39 extends through the bifurcations 40 and 41 of the head 38, and through slots 42 in the end portions 43 of the levers 29 between the brackets 31, while a pin 44 upon the bottom 32 is received within a slot 45 of the longer bifurcation 41, thereby acting as a guide for the longitudinal movement of the head 38 and rod 37.

A coil spring 46 surrounds the rod 37 being connected at one end to the head 38 with its other end anchored as at 47 to the casing bottom 32. A top member or cover 48 is normally secured upon the casing 12 and it will be apparent that when the back 14 is elevated, the bolts 27 are positioned in the notches 26 and that when the back 14 is horizontal, the bolts will be in the notches 24. The back 14 may be intermediately inclined with the bolts 27 in the notches 25. With the back 14 upright, and held by the bolts 27, inward pressure exerted upon the block 34 moves the head 38 rearwardly, shifting the levers 29 to move the links 33 inwardly and retract the bolts 27 into the housing 28, thereby releasing the bolts from the arms 18. The back 14 may be then swung rearwardly to either its inclined or horizontal position, with the pins 21 sliding in the slots 22, the bolts 27 being permitted to enter either the keeper notches 25 or 24 as desired. Upon releasing the block 35, the spring 46 moves the head 38 forwardly and projects the bolts 27 through the housing 28 into whichever pair of keeper notches is in alinement with the housings.

When the back 14 is horizontal, as shown in Fig. 2, the top thereof is adapted to be positioned adjacent the forward edge of the rear cushion, not shown, whereby the cushion 13 and back 14 together, constitute a horizontal couch or bed. The ready adjustment of the back 14 and the locking thereof, in either of its three positions will be clear from this detailed description as well as the manner of release by pressing the block 34, the seat possessing great strength and rigidity in either of its adjustments.

While the form of the invention herein shown and described, is what is believed to be a preferred embodiment thereof, it is nevertheless to be understood that minor changes may be made therein without departing from the spirit and scope of the invention as claimed.

What I claim as new and desire to secure by Letters Patent is:—

1. An automobile seat comprising a base, a casing mounted thereon, having side extensions provided with longitudinal slots, a seat back hinged to the base, opposite housings carried by the casing, resiliently projected bolts in the housings, slidable transversely of the casing, retaining arms pivoted to the back having curved forward ends provided with keeper openings adapted for alining and receiving said bolts when the back is adjusted in either its upright or reclining positions, guide pins upon said arms rearwardly of the notches, slidably mounted in said slots, and retracting means for the bolts substantially centrally positioned in the front wall of the casing, at a point accessible at the forward side of the seat.

2. A reclining vehicle seat comprising a casing, transverse housings at opposite sides thereof, bolts slidable in said housings, brackets within the casing, oppositely curved levers pivoted to said brackets, with their end portions slotted between the brackets, links pivotally connected between the outer ends of said levers, and the inner ends of the bolts, an operating block slidably mounted in the front wall of the casing, a rearwardly projecting rod secured to said block, a bifurcated head upon the rear end of the rod, slidable between said bracket with the inner ends of the levers loosely pivoted between the bifurcations of the head, guide means for the lower longer bifurcation of the head, a spring encircling said rod attached at one end to the head, and with its other forward end anchored to the bottom of the casing, whereby the block is normally maintained forwardly flush with the outer face of the front wall of the casing, with the bolts projected outwardly of said housings, a hinged seat back mounted adjacent the rear end of the casing, and retaining arms for the back having keeper openings positioned in the path of travel of said bolts when the back is in its adjusted position.

3. A front seat for automobiles comprising a horizontal cushion, a back cushion hinged adjacent thereto, a mechanism casing beneath the cushion, retaining levers pivoted at opposite sides of the back slidably attached to opposite sides of the casing, an inwardly movable block slidably mounted in the front wall of the casing, adjustable brackets in the casing, engaging bolts for said notches projecting through the opposite sides of the casing, operating levers for the bolts pivoted to said brackets, and resiliently positioned means attached to the block and loosely pivoted to the levers between said brackets.

In testimony whereof I affix my signature.

THEOPHILUS FRANK SNYDER.